United States Patent
Chen

(10) Patent No.: US 7,554,456 B2
(45) Date of Patent: Jun. 30, 2009

(54) BATTERY POWER LEVEL INSPECTION DEVICE CO-CONSTRUCTED WITH SYSTEM INDICATORS OF NOTEBOOK COMPUTER AND INSPECTION METHOD THEREOF

(75) Inventor: Yen-Jen Chen, Taipei (TW)

(73) Assignee: MITAC Technology Corp., Taipei (TW)

( * ) Notice: Subject to any disclaimer, the term of this patent is extended or adjusted under 35 U.S.C. 154(b) by 70 days.

(21) Appl. No.: 11/370,061

(22) Filed: Mar. 8, 2006

(65) Prior Publication Data
US 2006/0238533 A1 Oct. 26, 2006

(30) Foreign Application Priority Data
Apr. 26, 2005 (CN) .................... 2005 1 0034282

(51) Int. Cl.
*G08B 21/00* (2006.01)
(52) U.S. Cl. .................... 340/636.2; 702/60
(58) Field of Classification Search .............. 340/636.2; 702/60–67
See application file for complete search history.

(56) References Cited

U.S. PATENT DOCUMENTS

| | | | |
|---|---|---|---|
| 5,809,449 A | * | 9/1998 | Harper .................... 702/63 |
| 6,252,511 B1 | * | 6/2001 | Mondshine et al. ...... 340/636.1 |

* cited by examiner

*Primary Examiner*—Daniel Wu
*Assistant Examiner*—Shirley Lu
(74) *Attorney, Agent, or Firm*—Apex Juris, pllc; Tracy M. Heims

(57) ABSTRACT

A radio frequency IC tag is provided which is excellent in weatherability, dustproofness, waterproofness, and static protection and capable of making a communication distance long even though each antenna section is made small in configuration. A first antenna equipped with an IC chip is formed on an upper surface of a first spacer. A second antenna is formed on a lower surface of a top cover. A second spacer is shaped in hollow form. The first spacer and the top cover are disposed on both sides of the second spacer with the first antenna and the second antenna being opposite to each other. Each of the first spacer, the second spacer and the top cover is formed of a synthetic resin. Thus, the IC chip and each antenna section are not exposed to the outside and hence weatherability is enhanced.

12 Claims, 5 Drawing Sheets

US 7,554,456 B2

BATTERY POWER LEVEL INSPECTION DEVICE CO-CONSTRUCTED WITH SYSTEM INDICATORS OF NOTEBOOK COMPUTER AND INSPECTION METHOD THEREOF

FIELD OF THE INVENTION

The present invention relates to inspection of power level of battery of notebook computers, and in particular to a battery power level inspection device that is co-constructed with system indicators of the notebook computer, as well as an inspection method thereof.

BACKGROUND OF THE INVENTION

Notebook computers are developed for the convenience of carrying. A primary difference between the notebook computers and desktop computers is that the former relies completely upon an internal power source, especially a battery pack, to supply the power required for operation, while the later is powered by electric main. Consequently, power management of the battery, inspection of the power level of the battery, power storage performance of the battery are some of the major concerns for notebook computer users and are important factors for smooth and continuous operation of the notebook computers.

A typical notebook computer comprises a central processing unit, a system basic input output system (SYS-BIOS) and an embedded controller connected to a keyboard, a keyboard basic input output system (KB-BIOS), memories, and interface circuits.

Besides control of keyboard, most of the currently available notebook computers also impose additional function associated with system management to the embedded controller. The embedded controller is often connected to an ISA bus of a host computer. The embedded controller comprises a keyboard controller, which is connected to a keyboard, and a system management controller (SMC), which is connected to a variety of devices of the notebook computer through a system management (SM) bus.

The embedded controller performs a variety of functions through the SMC and the SM bus, including thermal management, battery management, switch management, and power control.

Regarding the technology used to inspect the power level of a battery of a notebook computer, some notebook computers are manufactured with an independent circuit dedicated for inspection of the battery power level. Such a design, although advantageous in independent operation and being not affected by the operation of the computer itself, suffers the complication of overall circuit design caused induced by the additional inspection circuit. Further, interface between the notebook computer and the inspection circuit is also complicated. Other notebook computers perform inspection of battery power level through software loaded and executed in the notebook computer. This method requires consumption of resources of the notebook computer and cannot be performed until the computer is booted up with additional execution of the battery power level inspection software.

Both conventional ways of inspecting battery power level of notebook computers, including using independent inspection circuit to inspect the battery power level or executing battery power level inspection program to de inspection, have their own disadvantages and limitations. Apparently, further improvement remains a challenge for notebook computer manufacturers.

Further, precise control of battery power level of notebook computers is of vital importance in for example word processing or presentation. However, up-to-date, no simple and efficient way is available for general consumers to get aware of the battery power level. This is of particular concern for those computer users who are always in a hurry for booting of a computer is still very time consuming. This is troublesome.

SUMMARY OF THE INVENTION

Thus, an objective of the present invention is to provide a notebook computer battery power level inspection device that is co-constructed with system indicators of the notebook computer whereby the power level of the battery can be clearly indicated by lighting or flashing of the system indicators of the notebook computer for easy identification by the computer user.

Another objective of the present invention is employing an embedded controller of a notebook computer to detect and display the power level of the battery of the notebook computer whereby when a signal for testing the battery is applied to the embedded controller, the embedded controller drives the system indicators to light or flash in order to properly indicate the power level of the battery.

A further objective of the present invention is to provide a notebook computer battery power level that allows for easy test and display the power level of the battery of the notebook computer through system indicators of the notebook computer by user's actuation of a test switch or a predetermined key of a keyboard of the notebook computer.

To realize the above objectives, the present invention employs an embedded controller of a notebook computer to detect the status of a battery test signal and, in response thereto, generate a signal representing the power level of the battery. Upon detection of the battery test signal, the embedded controller drives individual system indicators of an indicator system of the notebook computer to light or flash for indicating the power level of the battery. The battery test signal can be generated by actuating a test switch or by actuating a predetermined one of the keys of a keyboard of the notebook computer.

In accordance with the present invention, when a computer user installs a battery pack in a notebook computer, the computer user can easy get aware of the power level of the newly installed battery with simple key striking. Further, since the battery power level display is con-constructed with the system indicators, the power level can be easily detected by simple key striking, regardless if the notebook computer is positioned on a computer decking, or if the computer is in an ON condition, or if the liquid crystal display of the notebook computer is open. With the present invention, no additional, independent circuit is required for battery power inspection and only minor modification of the program of the embedded controller can realize inspection and display of battery power level of the notebook computer

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
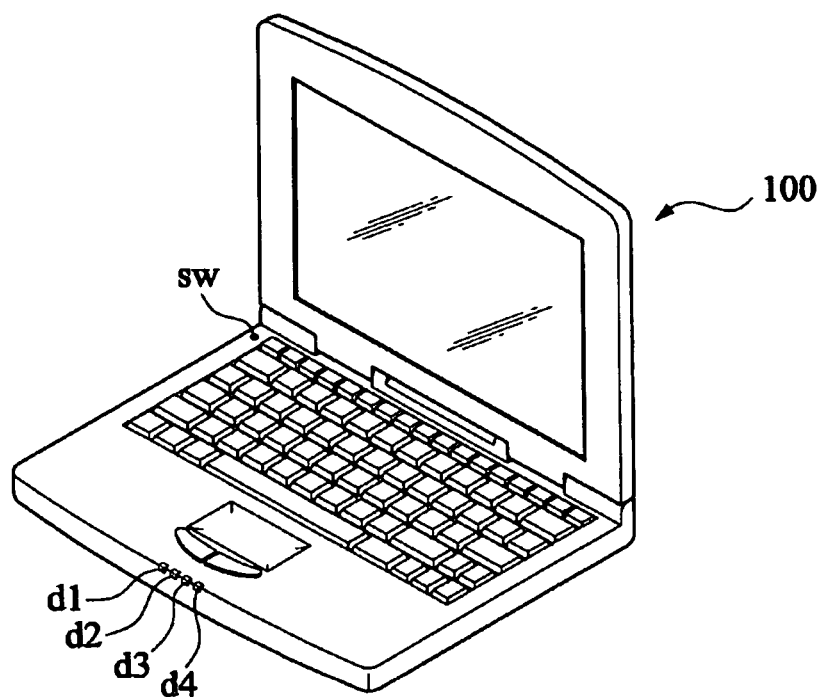
FIG. 1 is a perspective view showing a notebook computer comprising a battery power level inspection device embodying the present invention.
Figure 2:
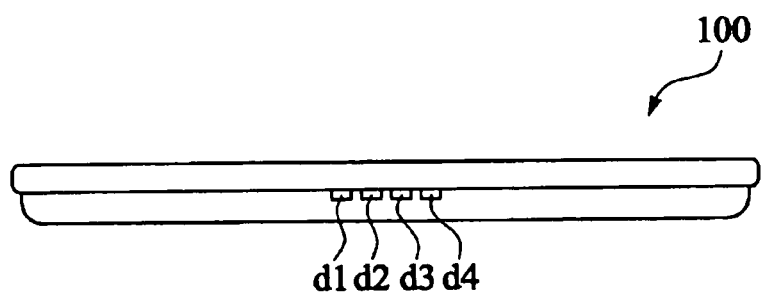
FIG. 2 is a front view of the notebook computer that comprises the battery power level inspection device of the present invention.

With reference to the drawings and in particular to FIG. 1, which is a perspective view of a notebook computer comprising a battery power level inspection device embodying the present invention, and FIG. 2, which is a front view of the notebook computer, the notebook computer, which is generally designated with reference numeral 100, comprises a plurality of system indicators d1, d2, d3, d4, serving to indicate system status of the notebook computer 100. For example, the system indicators d1-d4 can be indicators that indicate status of power supply, accessing of hard disk drive, battery charging and the likes.

Figure 3:
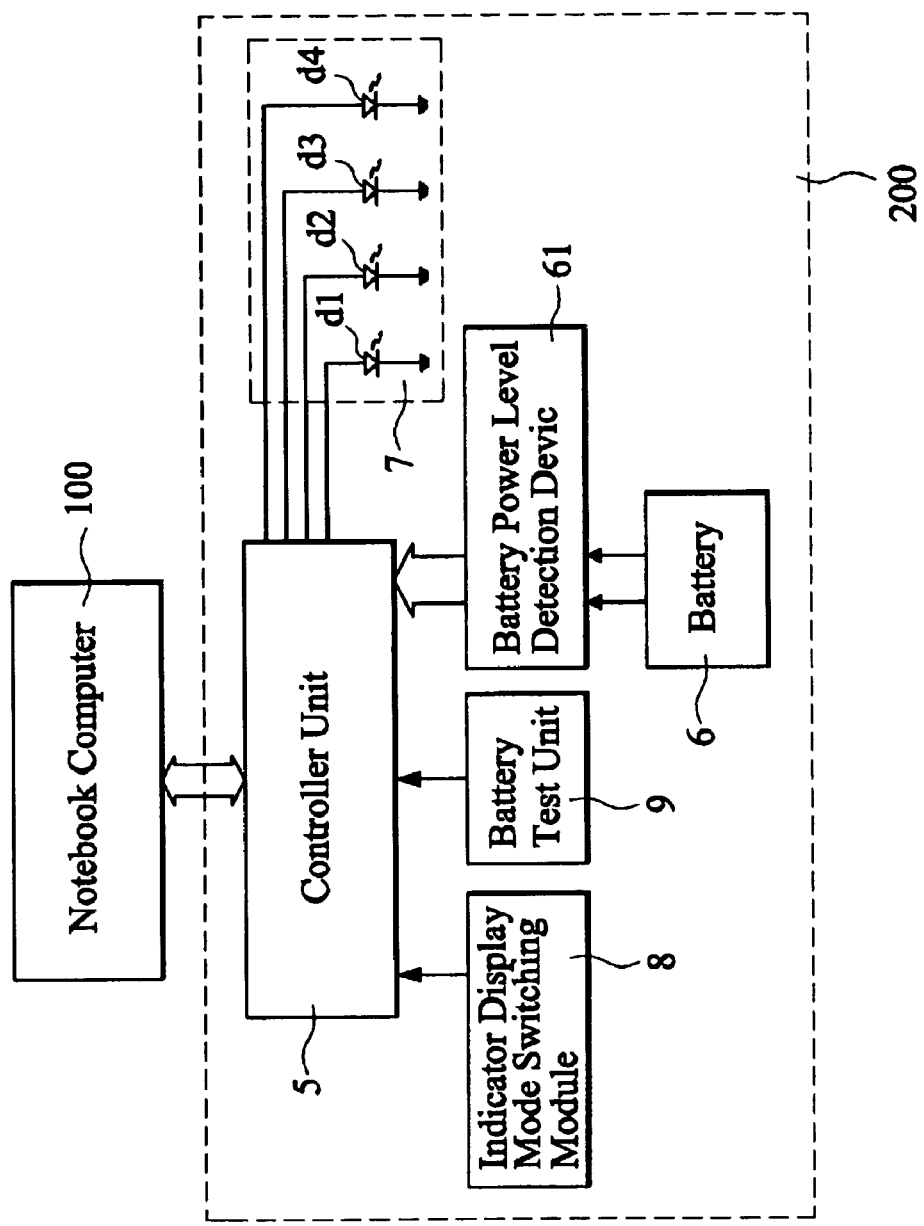
FIG. 3 is a circuit block diagram of the battery power level inspection device in accordance with the present invention.

FIG. 3 shows a circuit diagram, in a block form, of the battery power level inspection device of the present invention, which is generally designated with reference numeral 200, and to which the notebook computer 100 is connected. The battery power level inspection device 200 comprises a battery power level detection device 61, connected to a battery or battery pack 6 of the notebook computer 100 for detecting the current level of power that the battery 6 can supply and generating a digital battery-power-level signal that is applied to a controller unit 5.

The controller unit 5 is connected to the battery power level detection device 61 and receives the digital battery-power-level signal from the battery power level detection device 61.

An indicator display mode switching module 8 connected to the controller unit 5 selectively switches between a system status display mode and a battery power level display mode, which respectively show the system status of the notebook computer and the power level of the battery.

A battery test unit 9 is connected to the controller unit 5. Upon initiation of the battery test unit 9, the indicator display mode switching module 8 switches to the battery power level display mode, and the controller unit 5 receives the digital battery-power-level signal from the battery power level detection device 61 to drive the indicators d1-d4 and control the lighting or flashing of the individual indicators d1-d4.

Figure 4:
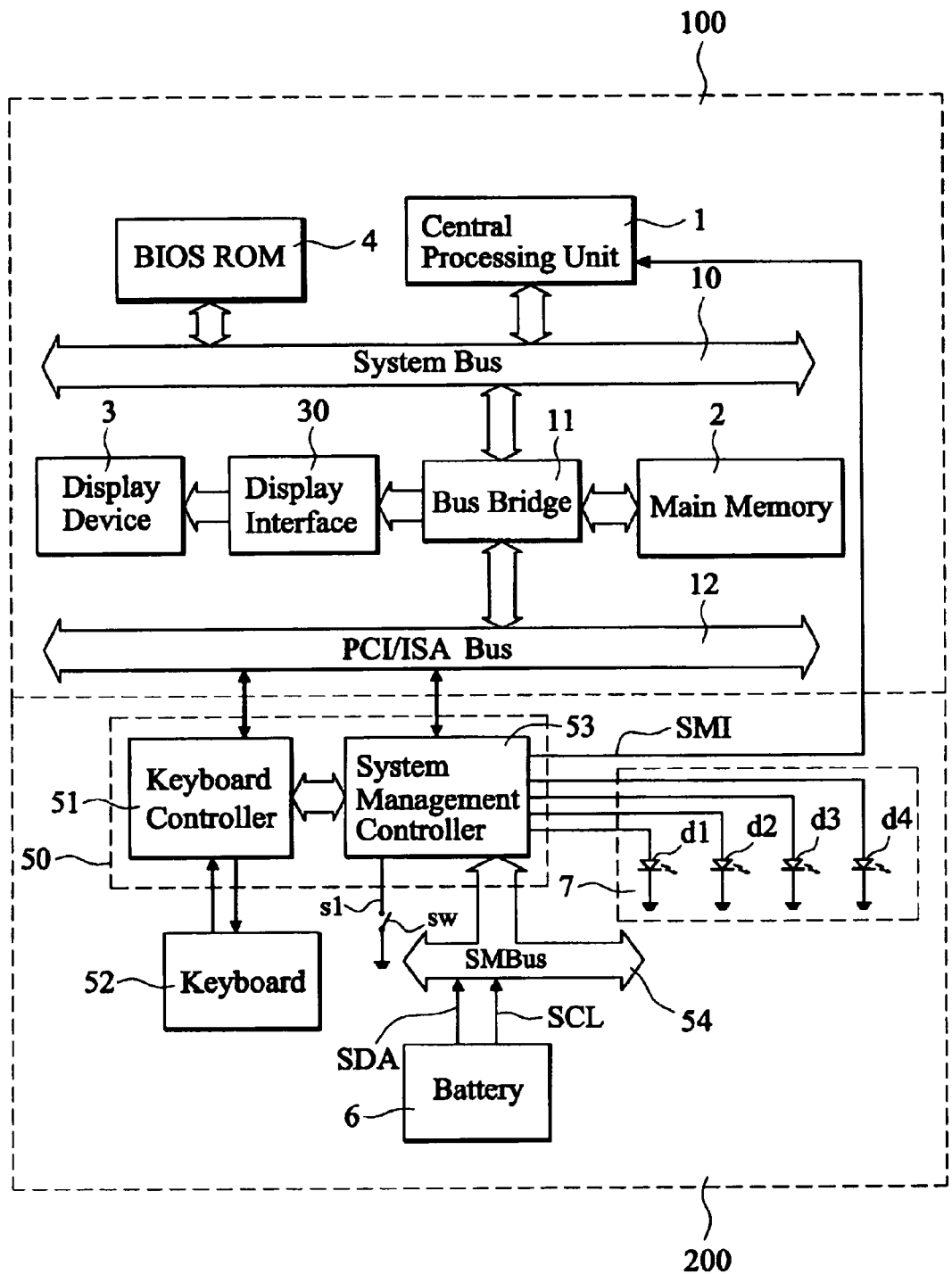
FIG. 4 is a first embodiment of a simplified circuit block diagram of a notebook computer that comprises the battery power level inspection in accordance with the present invention.

To realize the above described operation, the preset invention is embodied through the following embodiments. FIG. 4 shows a first embodiment of a simplified block diagram of a notebook computer incorporating the battery power level inspection device in accordance with the present invention. The notebook computer 100 comprises a central processing unit 1, a main memory 2, a display device 3, a basic input output system (BIOS) read-only-memory (ROM) 4, a system bus 10, a bus bridge 11, and a bus 12. The BIOS ROM 4 stores BIOS programs and power on self test (POST) programs that are necessary for booting the computer system. The display device 3 is connected through a display interface 30 to the bus bridge 11.

An embedded controller 50 is connected to the bus 12. The embedded controller 50 generally comprises a keyboard controller 51, which is connected to a keyboard 52, and a system management controller (SMC) 53, which is connected to a system management (SM) bus 54. The SM bus 54 has bus architecture of for example two-wire multi-master bus, which is allowed to connect with a plurality of device that controls the bus. The SM bus 54 serves as a control bus for system and power related management, wherein a master device initiates transfer of bus and provides clock signal and a slave device receives data from the master device through the bus, as well as transmitting data to the master device through the bus.

The SM bus 54 is connected to the battery 6, which can be for example a smart battery. The SM bus 54 are connected to the battery 6 by a clock line SCL and a data line SDA, which constitute, in part, standard wiring of the SM bus 54.

The SMC 53 generates a system management interrupt (SMI) that is applied to the central processing unit 1 of the notebook computer 100. To carry out system management, the embedded controller 50 stores a code in an internal register and then generates and applies the SMI to the central processing unit 1. Based on the system management codes stored in the main memory, the central processing unit 1, in response to the SMI, carries out the function corresponding to the code that the embedded controller 50 stores in the register.

The embedded controller 50 comprises a host interface connected to the bus 12, serving as an interface for data exchange with the central processing unit 1. In typical system architecture between an embedded controller and a computer device, the embedded controller 50 has a main interface that includes two address areas, of which one, being of hexadecimal 60H/64H address, is connected to the keyboard controller 51, while the other, being hexadecimal 62H/66H address, is connected to the SMC 53 for performing system management.

The SMC 53 of the embedded controller 50 is connected to an indicator system 7 that includes the indicators d1-d4. The embedded controller 50 controls the lighting or flashing of the individual indicators d1-d4 to show the system status of the notebook computer 100.

In normal operation of the notebook computer 100, all the system indicators d1-d4 show the operation status of the notebook computer 100. In case a test switch sw is actuated for example by a user of the computer, a battery test signal s1 is generated and applied to the embedded controller 50. Under this situation, the battery test signal s1 may serve as the battery test unit 9 of the present invention, while the indicator display mode switching module 8 is realized by the embedded controller 50.

The SMC 53 of the embedded controller 50, upon detecting the battery test signal, switches the indicator system 7 from the system status display mode to the battery power level display mode. In the battery power level display mode, the SMC 53 of the embedded controller 50 drives the individual indicators d1-d4 of the indicator system 7 so that the computer user can identify power level of the battery 6 by reading the lighting or flashing conditions of the individual indicators d1-d4.

In a preferred embodiment of the present invention, the test switch sw is arranged adjacent to the locations of the system indicators d1-d4 to simplify the operation thereof. Preferably, the test switch sw can be operated even when the liquid crystal display of the notebook computer is in a closed condition. In addition, the system indicators d1-d4 of the indicator system 7 are arranged in a front face of the casing of the notebook computer 100, or at locations that allow observation by the user even when the liquid crystal display of the notebook computer 100 is closed.

Figure 5:
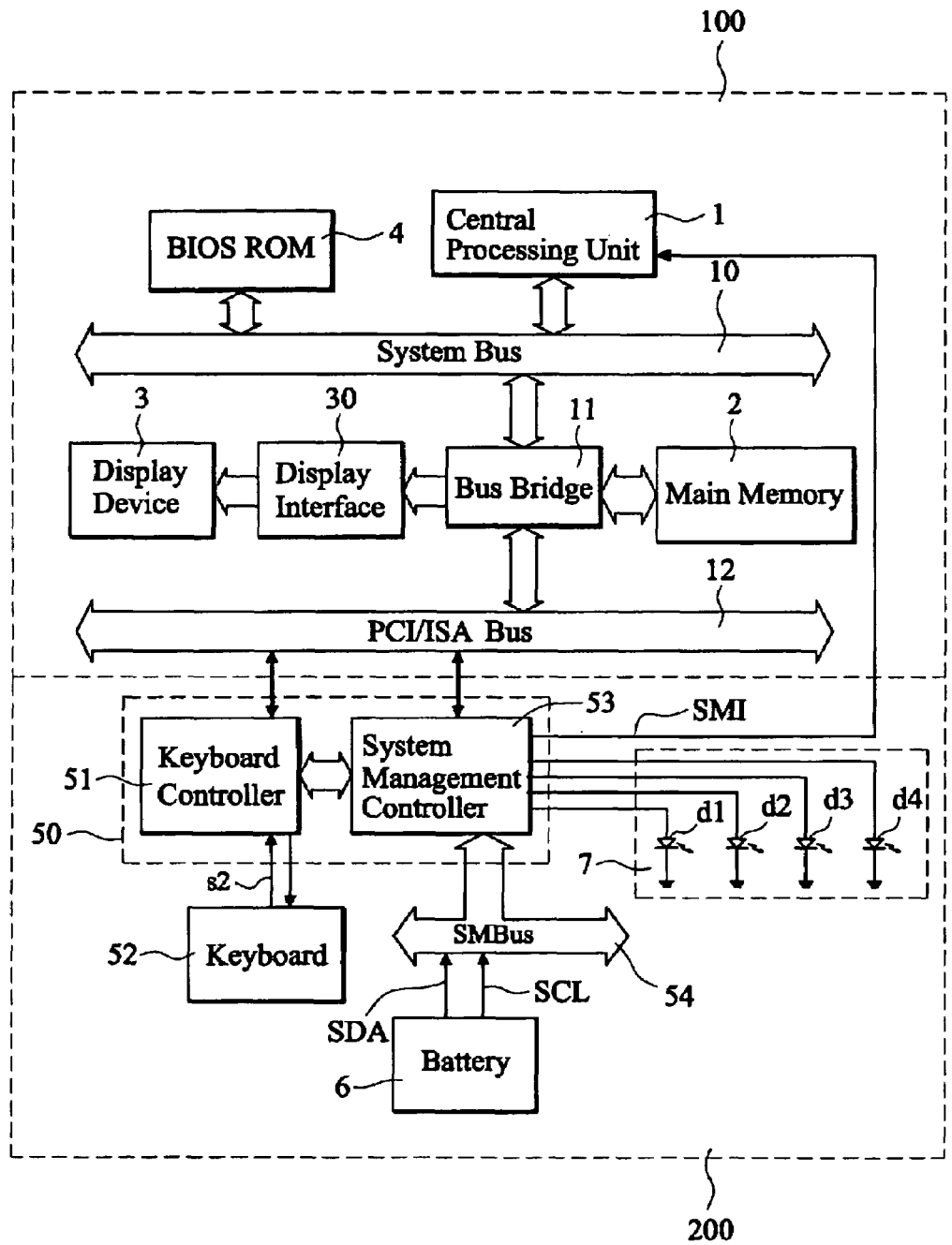
FIG. 5 is a second embodiment of a simplified circuit block diagram of a notebook computer that comprises the battery power level inspection in accordance with the present invention.

The battery test signal can be alternatively generated by for example actuation of a specific or predetermined key (such as a function key) of the keyboard 52 connected to embedded controller 50. FIG. 5 shows a second embodiment of a simplified block diagram of a notebook computer incorporating the battery power level monitoring device in accordance with the present invention. In the second embodiment, which is similar to the first embodiment, the notebook computer, also designated with reference numeral 100 for simplicity, comprises a central processing unit 1, a main memory 2, a display device 3, a BIOS ROM 4, an embedded controller 50, a system bus 10, a bus bridge 11, and a bus 12. A difference of the second embodiment from the first embodiment resides in that the embedded controller 50, upon detecting the actuation of a predetermined key or predetermined keys of the keyboard 52, which generates and applies a battery test signal s2 to the embedded controller 50, drives the individual system indicators d1-d4 of the indicator system 7 to light or flash for indicating the power level of the battery.

Figure 6:
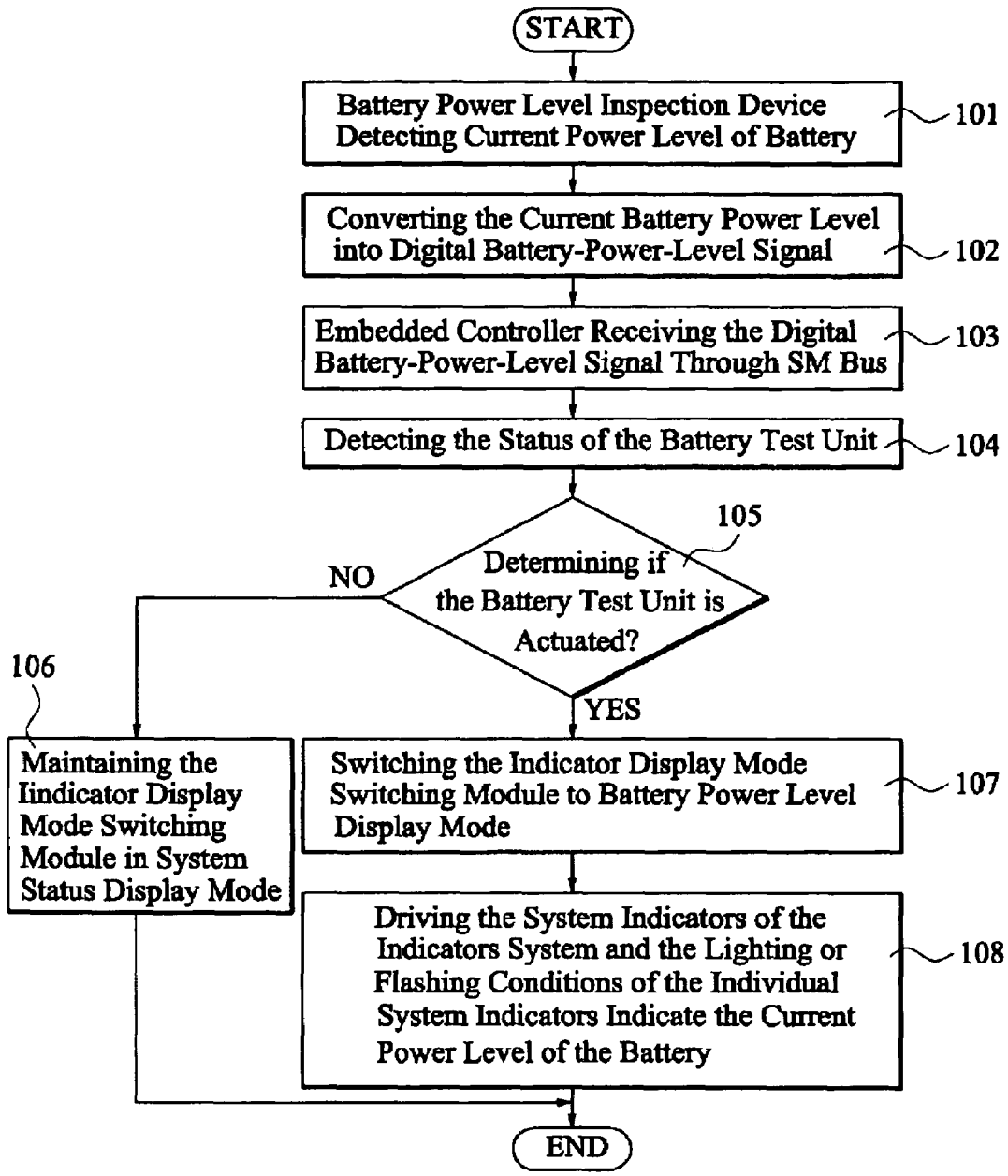
FIG. 6 is a flow chart of a battery power level inspection method in accordance with the present invention.

FIG. 6 shows a flowchart of a method for detecting power level of a battery of a notebook computer in accordance with the present invention. Initially, the battery power level inspection device carries out detection of the current power level of the battery (Step 101), and converts the current battery power level that is just detected into a digital battery-power-level signal (Step 102). The embedded controller then receives the digital battery-power-level signal through the SM bus (Step 103).

Thereafter, the embedded controller detects the status of the battery test unit (Step 104) to determine if the battery test unit is actuated (Step 105).

If the battery test unit is not actuated, then the indicator display mode switching module maintains in the system status display mode (Step 106). In such a mode, the system indicators d1-d4 of the indicator system illustrate for example power indication of the computer system, access to hard disk drive, and battery charging.

On the contrary, if the battery test unit is actuated, then the indicator display mode switching module is switched to the battery power level display mode (Step 107). In such a mode, the embedded controller drives the system indicators d1-d4 of the indicators system and the lighting or flashing conditions of the individual system indicators d1-d4 indicate the current power level of the battery of the notebook computer (Step 108).

Since the function of indication of battery power level is performed by the system indicators, the power level of the battery can be readily obtained by actuating the test switch, no matter if the notebook computer is coupled to a computer docking, or if the computer is turned on, or if the liquid crystal display is open.

The system indicators d1-d4 of the indicator system 7 can be single-color-light or dual-color-light light-emitting diodes, or alternatively, other lighting elements or lighting patterns can be used.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A battery power level inspection device co-constructed with system indicators of a notebook computer, for detecting and displaying a power level of a battery of the notebook computer, comprising:

a battery power level detection device, which is connected to the battery for detection of the power level and generating a digital battery-power-level signal;

an indicator system including a plurality of system indicators that are arranged externally on a casing of the notebook computer and normally show system statuses of the notebook computer;

a system management controller unit, which is connected via a system management bus to at least the battery power level detection device and the indicator system to receive the digital battery-power-level signal generated by the battery power level detection device and in turn drives the system indicators of the indicator system;

an indicator display mode switching module, which is switchable between a system status display mode and a battery power level display mode that drives the indicator system that selectively displays the system statuses or the power level; and a battery test unit, which, upon actuation, whenever the notebook computer is ON or OFF, switches the indicator display mode switching module to the battery power display mode.

2. The battery power level inspection device co-constructed with system indicators of the notebook computer as claimed in claim 1, wherein the battery test unit comprises a user actuateable test switch.

3. The battery power level inspection device co-constructed with system indicators of the notebook computer as claimed in claim 2, wherein the test switch is connected to the controller unit.

4. The battery power level inspection device co-constructed with system indicators of the notebook computer as claimed in claim 2, wherein the test switch is arranged adjacent to the system indicators.

5. The battery power level inspection device co-constructed with system indicators of the notebook computer as claimed in claim 1, wherein the battery is connected to the controller unit through a system management bus.

6. The battery power level inspection device co-constructed with system indicators of the notebook computer as claimed in claim 1, wherein the system indicators are arranged at a front face of a casing of the notebook computer.

7. The battery power level inspection device co-constructed with system indicators of the notebook computer as claimed in claim 1, wherein the battery test unit comprises a predetermined key of a keyboard of the notebook computer.

8. The battery power level inspection device co-constructed with system indicators of the notebook computer as claimed in claim 1, wherein the controller unit comprises an embedded controller of the notebook computer.

9. A method executed on a notebook computer for detecting and displaying a battery power level of the notebook computer by using system indicators of the notebook computer, where the system indicators are arranged externally on a casing of the notebook computer and normally show system statuses of the notebook computer, the method comprising the following steps:

(a) detecting the power level of a battery of the notebook computer;

(b) applying the detected power level of the battery to a controller unit;

(c) detecting status of a battery test unit;

(d) whenever the notebook computer is ON or OFF, maintaining an indicator display mode switching module for the system indicators in a system status mode if the battery test unit is not actuated, and switching the indicator display mode switching module to a battery power level display mode if the battery test unit is actuated; and (e) lighting/flashing the system indicators to display the current power level of the battery when the indicator display mode switching module is switched to the battery power level display mode.

10. The method for detecting and displaying battery power level of a notebook computer by using system indicators of the notebook computer as claimed in claim 9, wherein in step (a), the detected power level of the battery is converted into a digital battery-power-level signal, which is applied to the controller unit.

11. The method for detecting and displaying battery power level of a notebook computer by using system indicators of the notebook computer as claimed in claim 10, wherein in step (a), the detected power level of the battery is transmitted through a system management bus to the controller unit.

12. The method for detecting and displaying battery power level of a notebook computer by using system indicators of the notebook computer as claimed in claim 9, wherein the controller unit comprises an embedded controller of the notebook computer.

* * * * *